F. SIMONS.
BELL RINGER.
APPLICATION FILED SEPT. 16, 1910.
1,003,953.
Patented Sept. 19, 1911.
3 SHEETS—SHEET 3.
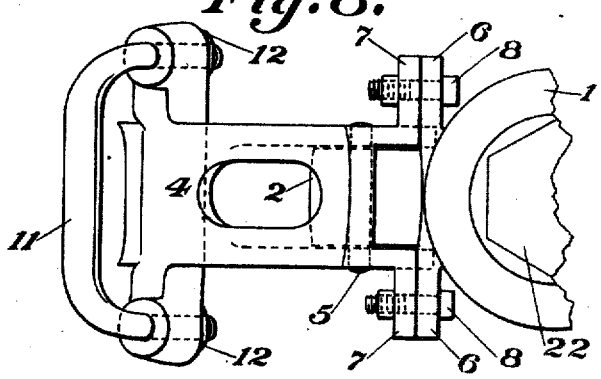
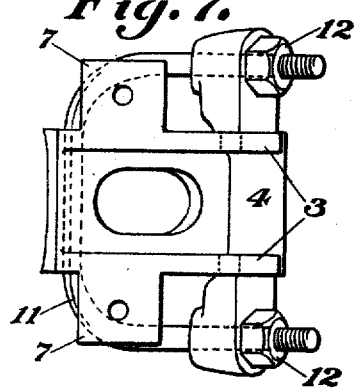
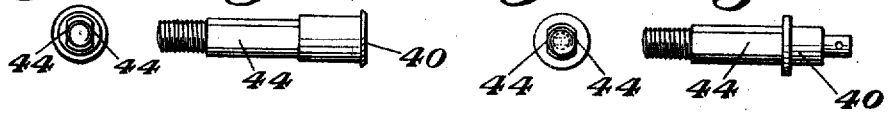
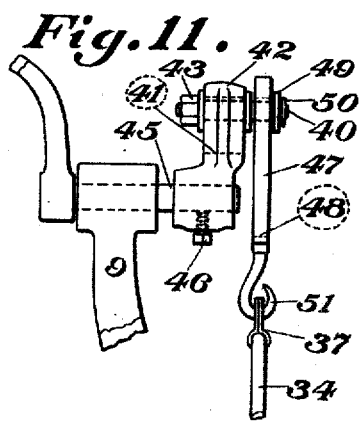
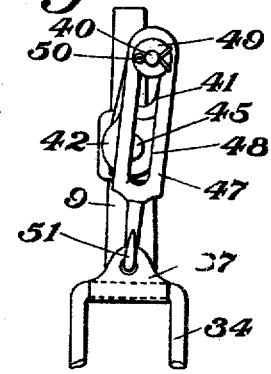
Witnesses:
George G. Anderson.
Harry H. Reiss.
Inventor:
Frank Simons
By Hugh N. Wagner
His Attorney.

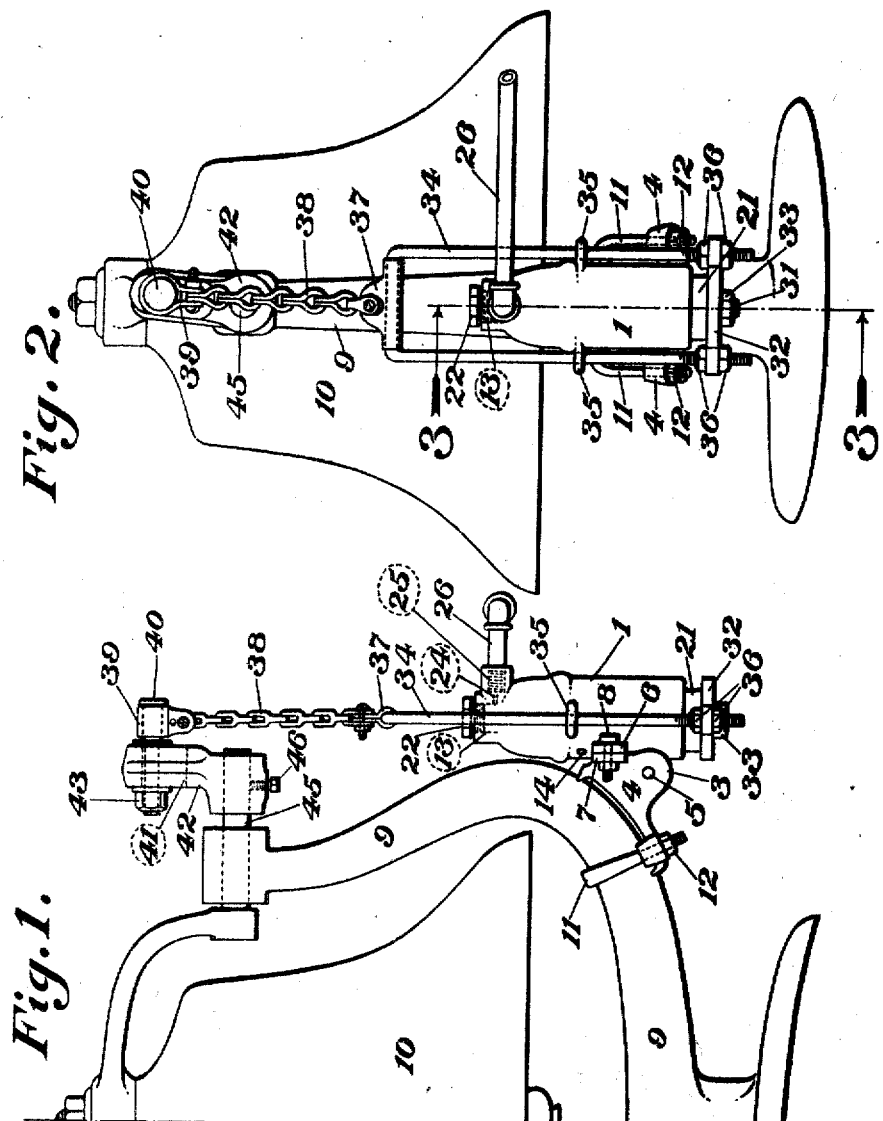

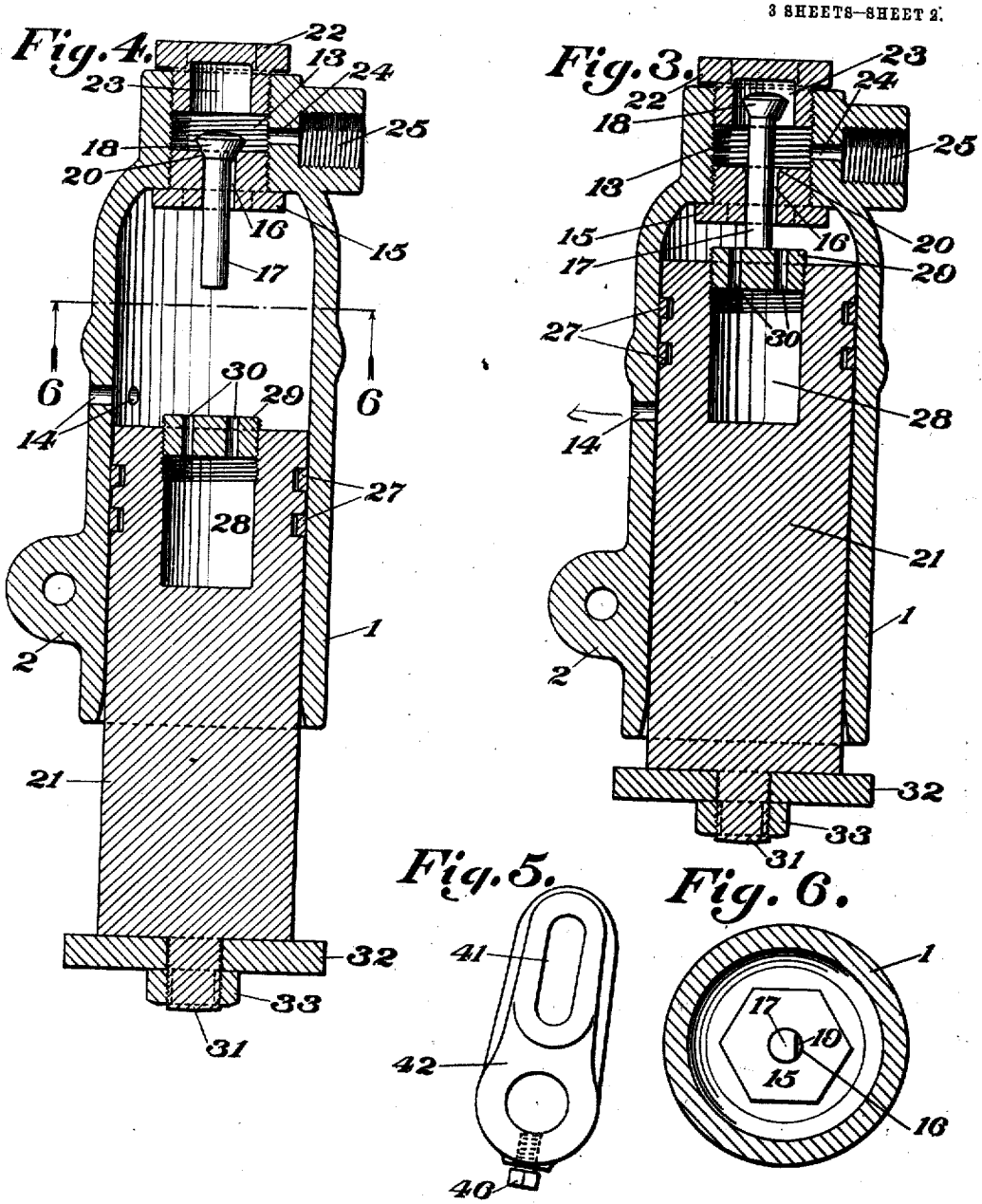
F. SIMONS.
BELL RINGER.
APPLICATION FILED SEPT. 16, 1910.
1,003,953.
Patented Sept. 19, 1911.
3 SHEETS—SHEET 2.
Witnesses:
George G. Anderson.
Harry H. Peiss.
Inventor:
Frank Simons,
By Hugh N. Wagner
His Attorney.

UNITED STATES PATENT OFFICE.

FRANK SIMONS, OF ST. LOUIS, MISSOURI.

BELL-RINGER.

1,003,953.          Specification of Letters Patent.    Patented Sept. 19, 1911.

Application filed September 16, 1910.   Serial No. 582,346.

*To all whom it may concern:*

Be it known that I, FRANK SIMONS, a citizen of the United States, residing at the city of St. Louis, State of Missouri, have invented certain new and useful Improvements in Bell-Ringers, of which the following is a specification.

This invention consists of an improved pressure bell ringer designed for automatically starting and continually ringing any bell to which it may be attached, and is particularly adapted for use upon railway locomotives, fire engines, ships, light-houses, and in signal-boxes.

The apparatus may, also, be successfully employed to actuate whistle valves and other similar contrivances.

In the accompanying drawings forming part of this specification, in which like numbers of reference denote like parts wherever they occur, Figure 1 is a view in full elevation, illustrating the device attached to the bell frame of a locomotive; Fig. 2 is a side view of same; Fig. 3 is a sectional view, on an enlarged scale, on the line 3—3, Fig. 2, showing the piston in its normal position to hold the inlet valve open; Fig. 4 is a similar sectional view showing the piston in position to allow the inlet valve to close and the motive fluid to exhaust from the cylinder; Fig. 5 is a side elevation of the crank that is attached to the gudgeon of the bell; Fig. 6 is a sectional view on the line 6—6, Fig. 4; Figs. 7 and 8 are detailed views of the adjustable and detachable bracket which retains the ringing device upon the bell frame; Figs. 9 and 10 are detailed views of the adjustable and detachable pin which is attached to the crank; Figs. 11 and 12 are detailed views of an alternate form of means for connecting the crank with the piston; and Figs. 13 and 14 are detailed views of the adjustable and detachable pin which is used in connection with the crank depicted in Figs. 11 and 12.

The cylinder 1 bears a lug 2 that is pivotally attached to lugs 3 of bracket 4 by means of pin 5 and, also, a pair of lugs 6 that is fastened to lugs 7 of bracket 4 by bolts 8, or the like, said bracket being secured to the frame 9 of the bell 10 by means of a U-bolt or clamp 11 and nuts 12, which, when loosened on said bolt 11, allow said bracket to be raised or lowered as may be desired. To adjust the position of cylinder 1 relative to bracket 4 washers, or the like (not shown in the drawings), can be placed between lugs 6 and 7 in order to hold said cylinder farther away from said bracket.

A screw-threaded opening 13 is formed in one end of cylinder 1 and exhaust ports 14 are formed in the side of said cylinder. A screw-threaded valve casing 15 fits into the inner end of opening 13 and contains a passage 16, which communicates with said opening and the interior of cylinder 1. The valve-stem 17 of valve 18 is adapted to slide reciprocatively in passage 16 of valve-casing 15 and is provided with a flattened side 19, which allows the motive fluid to pass from opening 13 into the interior of cylinder 1, when valve 18 is not in engagement with seat 20. Said valve-stem projects from passage 16 into the interior of cylinder 1 and rests upon the inner end of piston 21, when the latter reaches the end of its inward stroke in said cylinder, with the result that valve 18 is held out of engagement with seat 20 in order to allow the motive fluid to enter the interior of said cylinder. Piston 21 normally occupies the position depicted in Fig. 3, so that valve-stem 17 rests thereon and holds valve 18 out of engagement with seat 20, but, when the motive fluid enters the interior of cylinder 1, said piston is forced away from valve-stem 17 to the position depicted in Fig. 4, whereby valve 18 is allowed to move into engagement with seat 20 and the motive fluid within said cylinder is allowed to exhaust through ports 14. The outer end of opening 13 is closed by means of a screw-threaded plug 22 that contains a chamber 23, into which valve 18 protrudes, when said valve is held out of engagement with seat 20, as hereinabove described. An aperture 24 extends from opening 13 to an opening 25, which is preferably screw-threaded to receive a pipe 26, and discharges the motive fluid from said pipe into opening 13. Said pipe 26 conducts compressed air, steam, or other motive fluid to aperture 24, and, when the ringing device is used upon a locomotive, said pipe is connected either with the air-compressor or the boiler and the admission of the motive fluid is governed by a valve in the cab of the locomotive (not shown in the drawings).

The piston 21 is reciprocatively mounted in cylinder 1 and is provided with ordinary packing rings 27. The inner end of piston 21 contains a chamber 28 one end of which is preferably screw-threaded internally to receive a screw-threaded plug 29. Apertures 30 are formed in plug 29 and are arranged to allow chamber 28 to communicate with the interior of cylinder 1. When the motive fluid enters the interior of cylinder 1, same fills chamber 28 and, also, the interior of said cylinder and exerts its pressure against the inner end of piston 21, thereby forcing said piston outwardly until the exhaust ports 14 are uncovered. As soon as piston 21 uncovers the exhaust ports 14, the valve 18 moves against seat 20 and the motive fluid within cylinder 1 discharges through said exhaust ports, whereupon the motive fluid within chamber 28 will flow into the interior of said cylinder. The piston 21 is then moved inwardly, in the manner hereinafter described, and the motive fluid that remains within cylinder 1 is compressed by the inward movement of said piston and is forced through apertures 30 into chamber 28. Thus the inward stroke of piston 21 is cushioned and the valve-stem 17 is prevented from receiving an impact too suddenly from the end of said piston.

A screw-threaded projection 31 borne by the outer end of piston 21 extends through an opening in member 32 and receives a nut 33 or other suitable means to secure said member to said piston. A U-shaped rod 34 partly encircles cylinder 1 and preferably extends longitudinally thereof, so as to pass through openings in guide lugs 35 borne by said cylinder. The ends of rod 34 extend through openings in member 32 and are secured to said member by means of nuts 36, or the like, so that, when piston 21 reciprocates within cylinder 1, said rod moves with said piston. The middle part of rod 34 bears a member 37 to which one end of a chain 38, or the like, is attached, and the other end of said chain is fastened to member 39 that is loosely mounted on a pin or bolt 40. Pin 40 is fastened in slot 41 in crank 42 by the nut 43 and is provided with flattened sides 44, which fit closely to the sides of slot 41 in order to prevent said pin from turning in said slot. When nut 43 is loosened on pin 40, the latter can be adjusted in slot 41 so that the rock-arm can be lengthened or shortened. Crank 42 is fastened to the gudgeon 45 of bell 10 by set-screw 46. The chain 38 is preferably formed with such length that same holds rod 34 in position to maintain piston 21 at the end of its inward stroke, when bell 10 remains at rest. In order to facilitate the starting of the bell 10 automatically, the crank 42 is secured in such position to the gudgeon 45 as to cause same normally to incline from a vertical line passing through the center of said gudgeon and, when motive fluid enters cylinder 1 and forces piston 21 downwardly as hereinabove described, rod 34 and chain 38 move downwardly with said piston and pull said crank to one side, thereby rocking bell 10 and obviating the necessity of using a bell rope to start the bell ringing. The length of chain 38 is sufficient to allow the cylinder 1 to be clamped low enough to allow the member 39 to rotate past member 37, in case the momentum of bell 10 causes same to make a complete revolution when rod 34 is at the end of its upward stroke.

In the alternate form of connection between the rod 34 and crank 42, as depicted in Figs. 11 and 12, the chain 38 is omitted entirely and a member 47 is substituted therefor. One end of pin 40 extends through a slot 48 in member 47 and bears a washer 49 that is held in place by means of a cotter 50, or the like, in order to prevent said member from slipping off said pin. One end of member 47 bears a hook 51, which passes through an opening in member 37, and, when rod 34 is pulled downwardly as hereinabove described, the member 47 moves downwardly with same and pulls crank 42 to one side, thereby rocking bell 10. The slot 48 allows the pin 40 to slide therein while the bell is rocking after the motive fluid is cut off.

The operation of the device is as follows: Compressed air, steam, or other motive fluid is admitted into opening 13 from the source of supply, thence passes downwardly through passage 16 into the interior of cylinder 1 and not only fills chamber 28, but fills the interior of the head of said cylinder, thereby exerting its pressure against the end of piston 21 and forcing said piston downwardly and away from valve-stem 17. This downward movement of piston 21 causes rod 34 and chain 38 to move downwardly and to pull crank 42 to one side or the other, whereby gudgeon 45 is rocked and bell 10 caused to ring. When the piston 21 reaches the limit of its downward stroke, i. e., when the end of same uncovers exhaust ports 14, the motive fluid within cylinder 1 exhausts through said ports and thereby allows the supply of motive fluid to force valve 18 against seat 20, with the result that the admission of motive fluid into the interior of said cylinder is cut off. The cutting off of pressure by the seating of valve 18 upon seat 20 in the interior of cylinder 1 allows piston 21 to be raised by the upward pull of chain 38 and rod 34, both of which are pulled upwardly by the bell 10 returning to its normal position. This ascent of piston 21 causes plug 29 to engage the end of valve stem 17 and to push same upwardly, whereby valve 18 is raised out of engagement with seat 20 and motive fluid is again allowed to enter the interior of cylinder 1. The momentum acquired by the bell 10 in returning forces crank 42 to rock to the opposite side of the center of gudgeon 45.

Simultaneously with the passing of crank 42 to the opposite side of the center of gudgeon 45, the motive fluid which has entered the interior of cylinder 1 forces piston 21 downwardly. Rod 34 and chain 38 again move downwardly with piston 21 and rotate crank 42 and gudgeon 45 in the opposite direction, thereby ringing bell 10. Valve 18 is closed as before, when piston 21 reaches the end of its downward stroke, and allows the bell 10 to return, causing crank 42 to pull said piston upwardly. Crank 42 is rocked over the center of gudgeon 45, the valve 18 reopened, and the cycle is repeated until the motive fluid is shut off. When piston 21 reaches the end of its downward stroke and valve 18 closes, the motive fluid within cylinder 1 exhausts through ports 14, whereupon the motive fluid contained within chamber 28 will flow into the interior of cylinder 1 and, while said piston moves upwardly, the motive fluid is compressed within said cylinder and forced through apertures 30 back into chamber 28, thereby cushioning the upward stroke of piston 21 and preventing the end of stem 17 from receiving an impact too suddenly from plug 29.

I claim:

1. In a bell ringing device, the combination of a cylinder having a valve chamber in one end thereof, a piston reciprocatively mounted in said cylinder and having a compression chamber in the end adjacent said valve chamber, a reciprocating valve mounted for axial movement in said valve chamber, and a stem on said valve adapted to project into the interior of said cylinder and normally to rest upon the top end of said piston, said stem being free of connection with the piston and having means to admit motive fluid into the interior of said cylinder when said valve is unseated said cylinder having an exhaust port in its periphery to allow the motive fluid to exhaust from said cylinder when said piston reaches the end of its outward stroke.

2. In a bell ringing device, a cylinder having a chamber at its top in communication therewith, a gravity valve controlling said communication and having its lower end extending into the cylinder, a piston reciprocatively mounted in the lower end of the cylinder and being free of connection with said valve, said piston having its upper end formed with an upwardly facing chamber for receiving motive fluid, an apertured plug closing the upper end of said piston chamber, means to admit motive fluid to said cylinder chamber, and means to exhaust the fluid from the cylinder.

3. In a bell ringing device, a cylinder having a motive fluid ingress at its top, a valve for controlling said ingress having its lower end depending in said cylinder, and a piston into the cylinder normally occupying a position at the top end of the cylinder so that the top end of the piston engages the lower end of the valve stem, and holds the valve open, and which piston when the same moves to its position at the lower end of the cylinder, is spaced from said valve stem and out of contact therewith.

4. In a bell ringing device, in combination, a cylinder having a valve chamber in the upper end thereof, a piston reciprocatively mounted in said cylinder, and a reciprocating valve mounted for axial movement in said valve chamber and provided with a stem projecting into the interior of said cylinder and adapted to normally rest upon the top end of said piston, said stem being free of connection with the piston and being provided with means for admitting motive fluid into the interior of said cylinder when said valve is unseated, said cylinder having an exhaust port in its periphery to allow the motive fluid to exhaust from said cylinder when the piston reaches the end of its downward stroke.

5. In a bell ringing device, the combination, of a cylinder having a valve chamber in its upper end, a piston reciprocatively mounted in said cylinder and provided with a compression chamber in the end adjacent said valve chamber, an apertured plug fitted in the upper end of said compression chamber, and a reciprocating valve mounted for axial movement in said valve chamber and provided with a stem projecting into the interior of said cylinder and adapted to normally rest upon the upper face of said plug, said stem being free of connection with the piston and being provided with means for admitting motive fluid into the interior of said cylinder when said valve is unseated, said cylinder having an exhaust port in its periphery to allow the motive fluid to exhaust from said cylinder when the piston reaches the end of its downward stroke.

In testimony whereof I have hereunto affixed my signature in the presence of two witnesses.

FRANK SIMONS.

Witnesses:
 GEORGE G. ANDERSON,
 GLADYS WALTON.